July 25, 1933. O. W. PATTERSON 1,919,666
CASTER AND THE LIKE
Filed Aug. 18, 1930 2 Sheets-Sheet 2
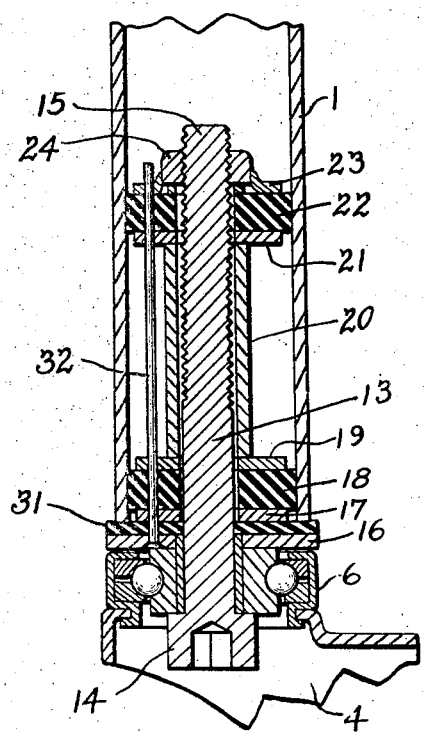
Fig. X.
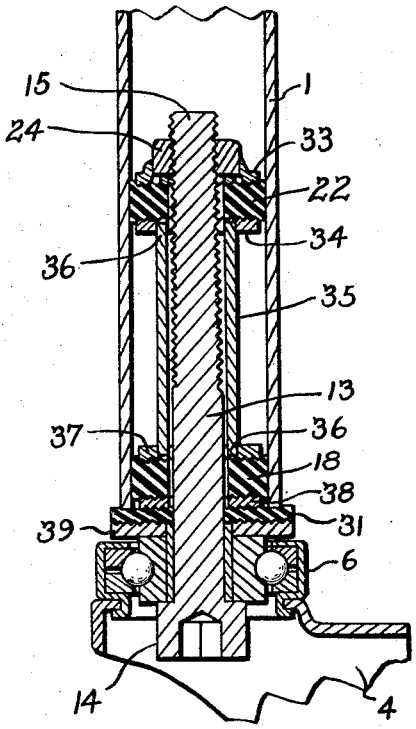
Fig. XI.
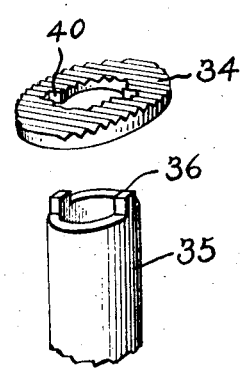
Fig. XII.
INVENTOR
Oliver Webster Patterson.
BY
Harry H. Styll
ATTORNEY Patented July 25, 1933

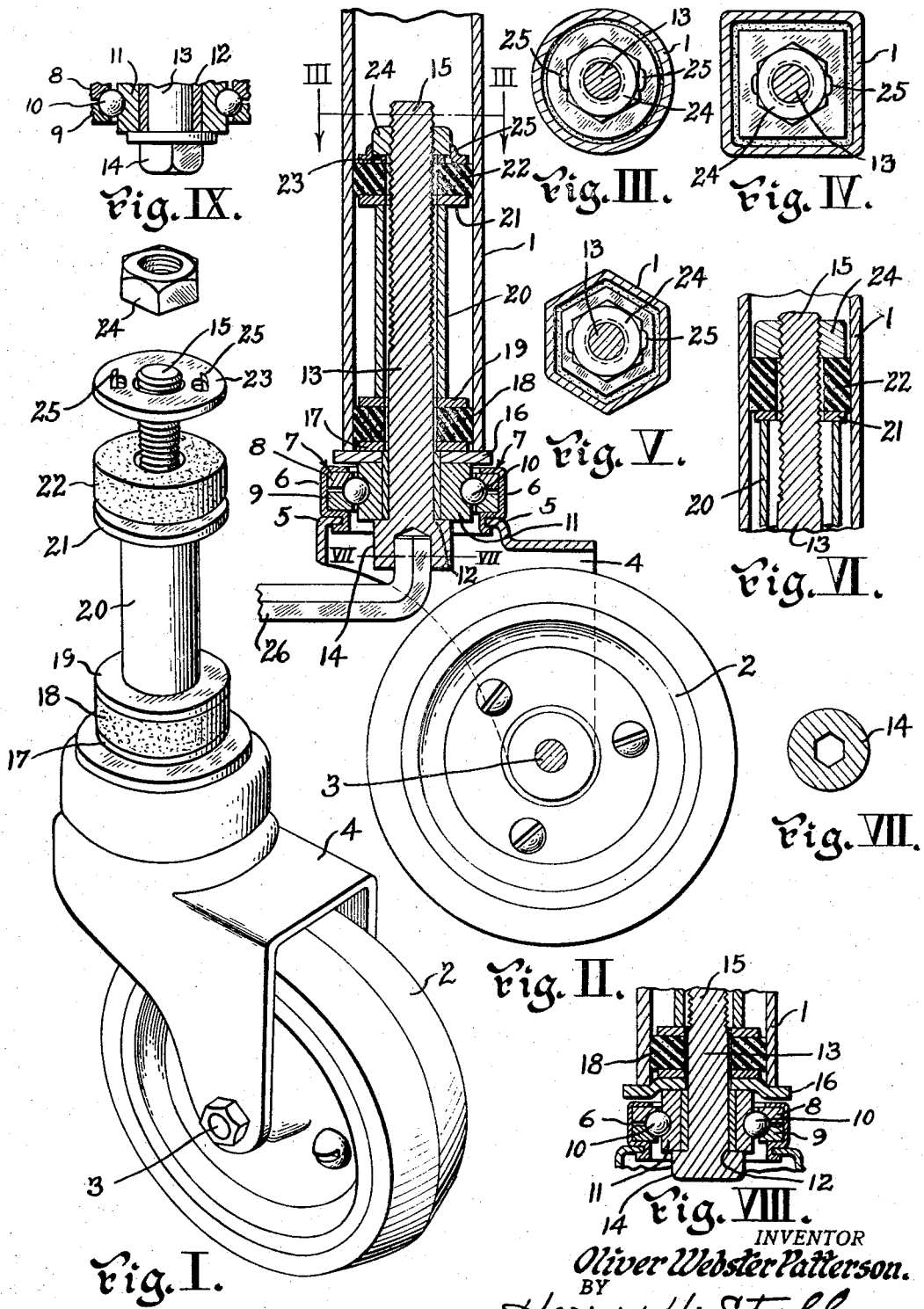

1,919,666

UNITED STATES PATENT OFFICE

OLIVER WEBSTER PATTERSON, OF SPRINGFIELD, MASSACHUSETTS, ASSIGNOR TO JARVIS & JARVIS, INC., OF PALMER, MASSACHUSETTS, A CORPORATION OF MASSACHUSETTS

CASTER AND THE LIKE

Application filed August 18, 1930. Serial No. 476,016.

This invention relates to improvements in expanding holding or clamping means and has particular reference to such expanding means for securing a caster stem or analogous device to the article to which it is attached.

The principal object of the invention is to provide improved expanding means adapted to fit various sizes and shapes of attaching sockets or fixtures.

Another object of the invention is to provide simple and inexpensive connecting or expanding means that are easily adjusted to the attaching fixtures.

Another object of the invention is to materially reduce the cost of production of such expanding clamping means and to reduce to a minimum the number of constituent parts thereof.

Another object of the invention is to provide an improved caster that may be easily and quickly attached to or detached from the article to which it is to be applied.

Another object of the invention is to produce such attaching or clamping means by means of a single piece of resilient material, thereby doing away with expensive cooperating parts which become easily deranged and out of working order.

Another object of the invention is to produce such expanding or clamping means by means of simple standard parts which are easily and cheaply obtained or produced and adapted to the structure.

Other important objects of the invention are to provide improved expanding means of this character which will provide added cushioning or shock absorber effects not obtainable with metallic or similar devices and which will also provide a noise insulator between the metallic attaching devices and the caster or other article to which the device is applied. And further to provide improved means for taking up shock and preventing noise in those cases where wheels are used that are not provided with rubber or other resilient tires.

Another object of the invention is to provide improved means which will readily adapt or seat themselves to any shape of rough tubing or similar attaching means, particularly if such means should be out of shape or depart from regular conformation.

Another object of the invention is to provide improved expanding means which will operate upon the principle of the compressibility latent in the material of the expanding means itself to provide cushioning or shock absorptive properties as well as the tightening and loosening properties required in an expander of this character.

Another object of the invention is to provide universally operable expanding means which will not require skilled mechanics to adjust the parts to the attaching devices to which it is to be applied either in applying or removing them, and to make said means applicable to a large range of sizes of attaching devices or tubes.

Another object of the invention is to provide improved means of holding the several parts of the expanding means in related alignment to facilitate the ease of attachment of the expanding means to the article to which it is to be attached.

Other objects and advantages of the invention will become apparent from the following description taken in connection with the accompanying drawings. It is apparent that many changes in the details of construction and arrangement of parts may be made without departing from the spirit of the invention as expressed in the accompanying claims. The preferred forms only have been shown by way of illustration; hence I do not wish to be limited to the exact details shown and described.

It is well known that the attaching sockets and fixtures for casters and similar devices vary in size and in other characteristics. It is, therefore, one of the prime objects of this invention to provide expansible means easily and positively operable to accommodate these conditions. As these expansible means fit within the interior of their attaching sockets or fixtures it is also desirable to avoid complex fittings that are liable to get out of place, jam and become inoperable. It is also an important object of the invention to provide these fittings in simple, inexpensive and unitary structure having a minimum of working parts.

Referring to the drawings in which similar reference characters denote similar parts throughout:

Fig. I is a perspective view of a caster embodying the invention, with the attaching socket removed.

Fig. II is an elevation partially in section and showing the attaching socket in place.

Fig. III is a cross section on line III—III of Fig. II showing an attaching socket circular in cross section.

Fig. IV is a view similar to Fig. III, but showing an attaching socket square in cross section.

Fig. V is a view similar to Fig. III but showing an attaching socket hexagonal in cross section.

Fig. VI is a partial section similar to Fig. II, but showing a modified form of securing the compression member in place on the stem.

Fig. VII is a cross section on line VII—VII of Fig. II.

Fig. VIII is a partial section similar to Fig. II, but showing a modified form of washer at the bottom of the attaching socket.

Fig. IX is a partial section similar to Fig. II, but showing a modified form of the lower end of the caster stem.

Fig. X is a partial sectional view similar to Fig. II but showing a modification in which the several parts are held in alignment.

Fig. XI is a view similar to Fig. X showing another modification in which the several parts are held in alignment, and Fig. XII is a partial perspective view with the parts separated showing the connection of the spacer tube to a compression washer of Fig. XI.

The numeral 1 indicates the socket or attaching connection which is secured to the article to which the caster or similar device is to be attached; as shown this is a tube and may be round, square, hexagonal in cross section, or of other shape.

The caster wheel 2 is rotatably mounted on the axle pin 3 in the usual manner in the caster bracket or fork 4 which is secured at 5 to the shell 6 of the bearing 7, the parts being preferably pressed together. The bearing 7 comprises an upper bearing block 8 and a lower bearing block 9, each having a bearing race or groove for the balls 10 and an inner bearing block 11 having a corresponding race or groove for the balls 10. The parts of the bearing are held in related position by the shell 6 which is compressed over them.

In the inner bearing block 11 is a bushing 12 through which passes the caster stem 13 having the shouldered head 14 and a threaded upper portion 15. The shoulder of the head 14 bears on the under side of the inner bearing block 11 to position the stem 13 in related position to the parts of the caster. Above and resting on the inner bearing block 11 is the washer 16 on which rests the lower end of the attaching socket 1. In Fig. VIII the member 16 is shown as having an offset where it engages the lower end of the attaching socket, making a snug seat therefor. Above the washer 16 and surrounding the stem 13 is the compression washer 17, above which is the compression expander member 18 fitting on the stem 13 and made of a resilient compressible material, such as rubber, felt, etc. On the stem 13 and over the expander member 18 is the compression washer 19. Above the compression washer 19 is the spacer tube 20, through which the stem 13 passes. A compression washer 21 fits over the stem 13 and rests on the upper end of the spacer tube 20. Fitting over the stem 13 and resting on the compression washer 21 is the compression expander member 22, similar in construction and nature to the expander member 18. Over the expander member 18 and on the stem 13 is the compression washer 23 which engages the nut 24 on the threaded portion 15 of the stem 13, which rests between and is prevented from turning by the stops 25 on the washer 23.

The head 14 of the stem 13 may be provided with a socket for a socket wrench 26, as in Fig. II, or with the regular bolt head, as shown in Fig. IX. The expander members 22 and 18 may be held between compression washers, as shown in Fig. II, or the nut 24 may be placed directly in contact therewith as shown in Fig. VI.

The operation of the device is as follows:

When the parts have been assembled as described on the stem 13 and the nut 24 so positioned on the stem 13 that there is no compression on the expander members 22 and 18, that portion of the stem 13 carrying the expander members 22 and 18 is slipped into the attaching tube 1 until the washer 16 engages the end of the tube 1, the expander members 22 and 18 being so made that they can enter the tube 1 when not under compression. The nut 24 on the stem 13 is prevented from turning by the stops 25 on the washer 23. The stem 13 is then rotated by means of a wrench, such as 26, operating on the head 14. The rotation of the stem 13 compresses the expander members 22 and 18 between the compression washers causing the outer edges of said expander members to tightly engage the interior wall of the attaching tube 1, thus holding the caster firmly in place in relation to the said tube 1. To withdraw the stem and caster with it the operation is, of course, the reverse, the edges of the expander members 22 and 18 retreating from the inner wall of the tube 1 as the compression on them is relieved.

In Fig. X, the expanding parts are held in alignment and prevented from changing their relative positions by means of the rod 32 which passes through the washers 16, 31, 17, 19, 21 and 23 as well as through the two compression members 18 and 22. In this modification a resilient washer 31 of rubber or other resilient material is placed between the washers 16 and 17 and extends out under the ends of the spacer tube 20. This washer acts as a noise and shock absorber between the expander and the attaching tube 1.

In Fig. XI the expanding parts are held in alignment and prevented from changing their relative positions by interlocking the parts together. The upper washer 33 has its under side serrated so that it will bite into the expanding member 22, the upper side of washer 34 is also serrated where it engages the member 22. This washer 34 is provided with indents 40—Fig. XII, into which the prongs 36 of the spacer tube 35 fit. The bottom of the spacer tube 35 is similarly fitted to the washer 37 which is serrated on its under side where it contacts with the expansion member 18. The washer 38 is serrated on both its top and bottom sides and the upper side of washer 39 is also serrated. The washer 31 is similar in construction and use to washer 31 of Fig. X. It is clear that when the stem 13 is rotated in the nut 24 to put the parts under compression that the parts 33, 22, 34, 35, 37, 18, 38, 31 and 39 will be interlocked and held in nonrotative alignment. The washer 39 acts as a noise and shock absorber as in Fig. X.

From the foregoing it will be seen that I have provided exceedingly simple, efficient and economical means for carrying out all of the objects of the invention and of obtaining the advantages thereof with a minimum of parts and cost of production.

Having described my invention, I claim:

1. In a device of the character described for use in connection with a hollow socket attaching member, a caster bracket having separated wheel supporting members and a portion connecting the supporting portions, said connecting portion having an opening therethrough, bearing means associated with the connecting portion and having an opening aligned with the opening in the connecting portion, a caster stem extending through said openings and rotatably mounted therein and having means by which it may be turned and adapted to extend into the socket of the attaching member, resilient washer means on the stem beyond the bearing means having a part which is adapted to extend into the socket and a part which is adapted to underlie the end of the socket, clamping means on the stem for compressing the resilient washer means, and interengaging means between the clamping means and stem adapted to compress the resilient means on the turning of the stem to cause the resilient means to frictionally engage the internal walls of the socket to hold the united parts therein.

2. In a device of the character described for use in connection with a hollow socket attaching member, a caster bracket having separated wheel supporting members and a portion connecting the same and having an opening therethrough, bearing means associated with the connecting portion and having an opening therethrough aligned with the opening in the connecting portion, a caster stem extending through said openings and rotatably mounted therein and having means by which it may be turned and adapted to extend into the socket of the attaching member, a plurality of separated resilient washer means on the stem beyond the bearing means and adapted to extend into the socket, clamping means on the stem for compressing the resilient means, an extension member between the clamping means of adjacent resilient means, and means interengaged with the stem for compressing the resilient means when the stem is turned to cause the resilient means to frictionally engage the inner walls of the socket member to hold the united parts therein.

3. In a device of the character described for use in connection with a hollow socket attaching member, a caster bracket having separated wheel supporting members and a portion connecting the same and having an opening therethrough, bearing means associated with the connecting portion and having an opening therethrough aligned with the opening in the connecting portion, a caster stem extending through said openings and rotatably mounted therein and having means by which it may be turned and adapted to extend into the socket of the attaching member, a plurality of separated resilient washer means on the stem beyond the bearing means and adapted to extend into the socket, the one nearest the bearing means also having a portion adapted to extend out under the end of the said socket member, clamping means on the stem for compressing the resilient means, an extension member between the clamping means of adjacent resilient means, and means interengaged with the stem for compressing the resilient means when the stem is turned to cause the resilient means to frictionally engage the inner walls of the socket member to hold the united parts therein with the lower end of the socket member resting resiliently on the extension of the resilient means nearest the bearing means.

OLIVER WEBSTER PATTERSON.